(12) United States Patent
Uchida

(10) Patent No.: US 8,963,758 B2
(45) Date of Patent: Feb. 24, 2015

(54) IMAGE SENSOR AND IMAGE CAPTURING APPARATUS

(71) Applicant: Canon Kabushiki Kaisha, Tokyo (JP)

(72) Inventor: Mineo Uchida, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/929,282

(22) Filed: Jun. 27, 2013

(65) Prior Publication Data

US 2014/0016010 A1     Jan. 16, 2014

(30) Foreign Application Priority Data

Jul. 11, 2012   (JP) ................................. 2012-155881

(51) Int. Cl.
*H03M 1/12* (2006.01)
*H04N 5/3745* (2011.01)
*H04N 5/378* (2011.01)

(52) U.S. Cl.
CPC ........... *H04N 5/37455* (2013.01); *H04N 5/378* (2013.01)
USPC .......... 341/155; 348/222.1; 348/294; 348/308

(58) Field of Classification Search
CPC .................................................. H04N 5/3745
USPC .................... 341/155; 348/222.1, 294, 308
See application file for complete search history.

(56) References Cited

U.S. PATENT DOCUMENTS

| 8,081,243 | B2* | 12/2011 | Chou | 348/294 |
| 8,169,524 | B2* | 5/2012 | Yamauchi | 348/308 |
| 2010/0197949 | A1* | 8/2010 | Schoeley et al. | 556/449 |
| 2010/0253821 | A1* | 10/2010 | Yamamoto | 348/294 |
| 2012/0113286 | A1* | 5/2012 | Lim et al. | 348/222.1 |

FOREIGN PATENT DOCUMENTS

| JP | 05-048460 A | 2/1993 |
| JP | 2005-175517 A | 6/2005 |
| JP | 2010-045789 A | 2/2010 |

* cited by examiner

*Primary Examiner* — Jean B Jeanglaude
(74) *Attorney, Agent, or Firm* — Cowan, Liebowitz & Latman, P.C.

(57) ABSTRACT

An image sensor includes a pixel region in which a plurality of pixels are arranged in a row direction and a column direction. An A/D conversion circuit, arranged for each column, which compares an input signal with a ramp signal that changes with temporal unidirectionality, and converts the input signal into digital data. The sensor includes an amplitude control unit configured to compare the pixel signal with a predefined reference voltage, and input, to the A/D conversion circuit, the pixel signal if the pixel signal has a voltage less than the reference voltage, or a signal obtained by reducing an amplitude of the pixel signal if the pixel signal has a voltage of not less than the reference voltage, and a data expansion unit configured to add a predetermined number of bits to an A/D-converted data.

20 Claims, 10 Drawing Sheets

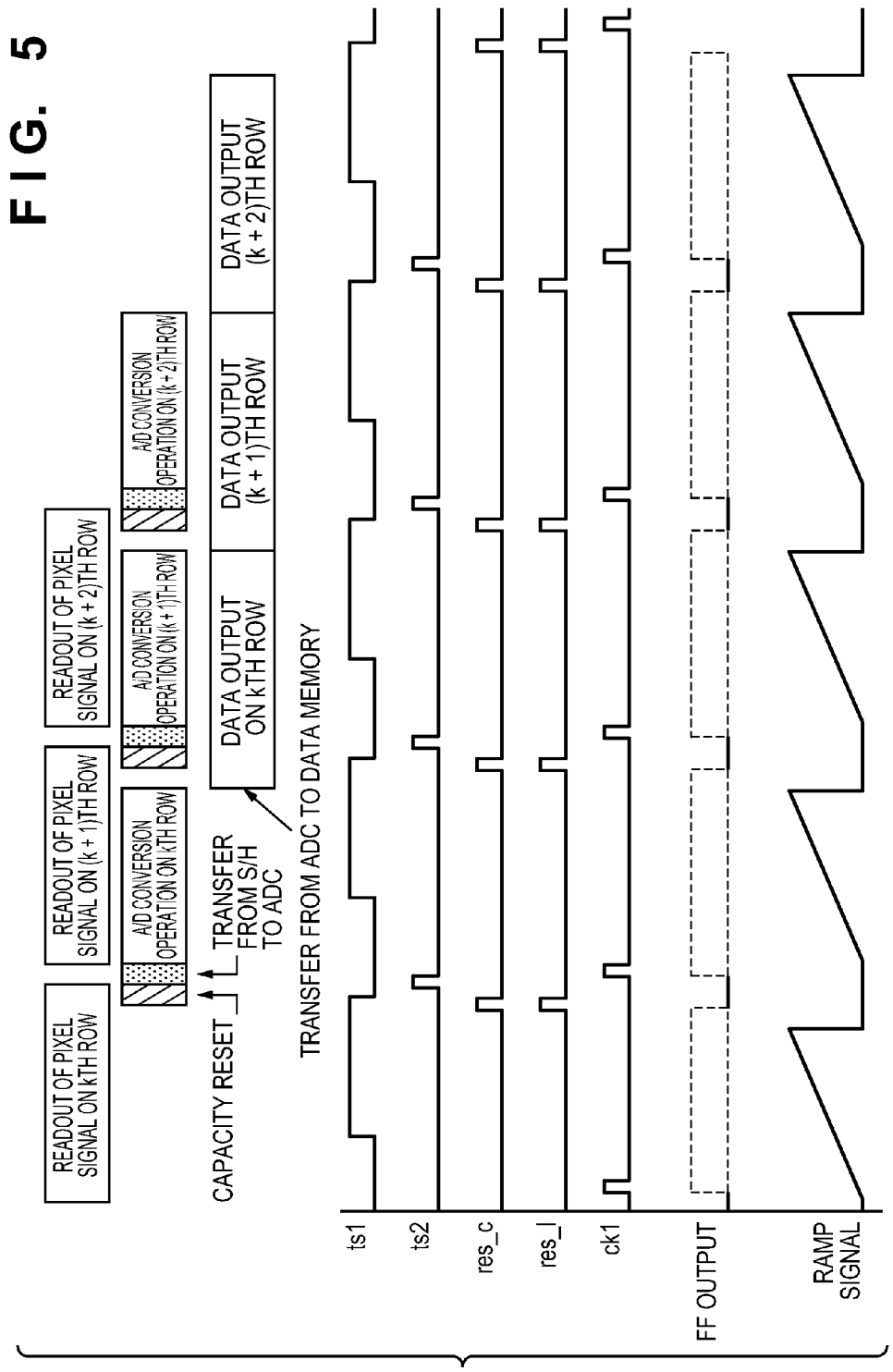

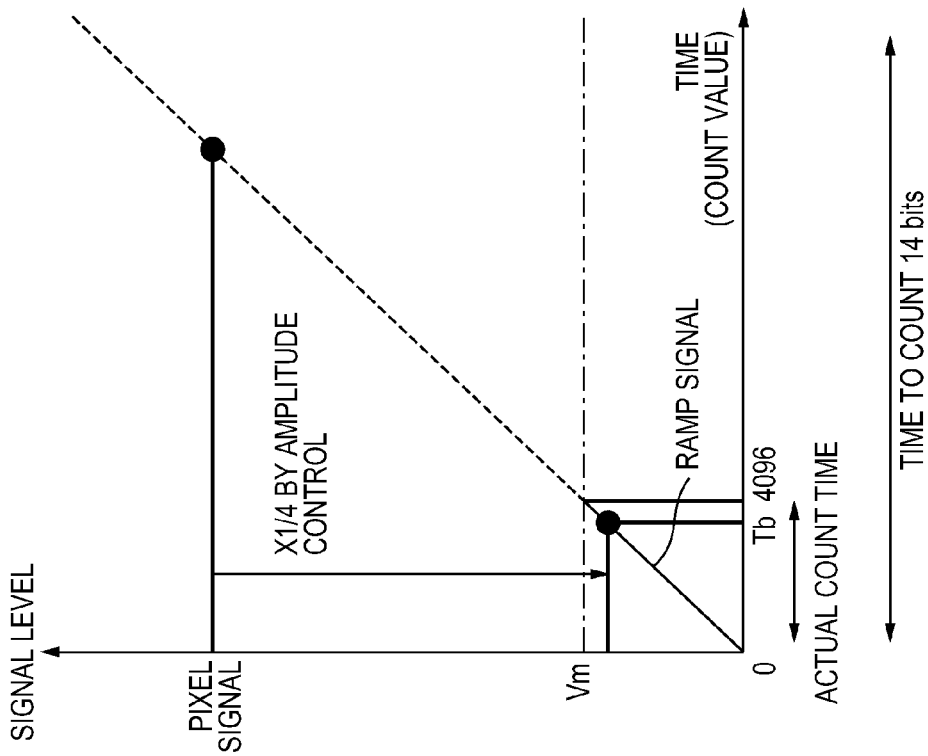
FIG. 6B  WHEN VOLTAGE OF PIXEL SIGNAL ≥ Vm
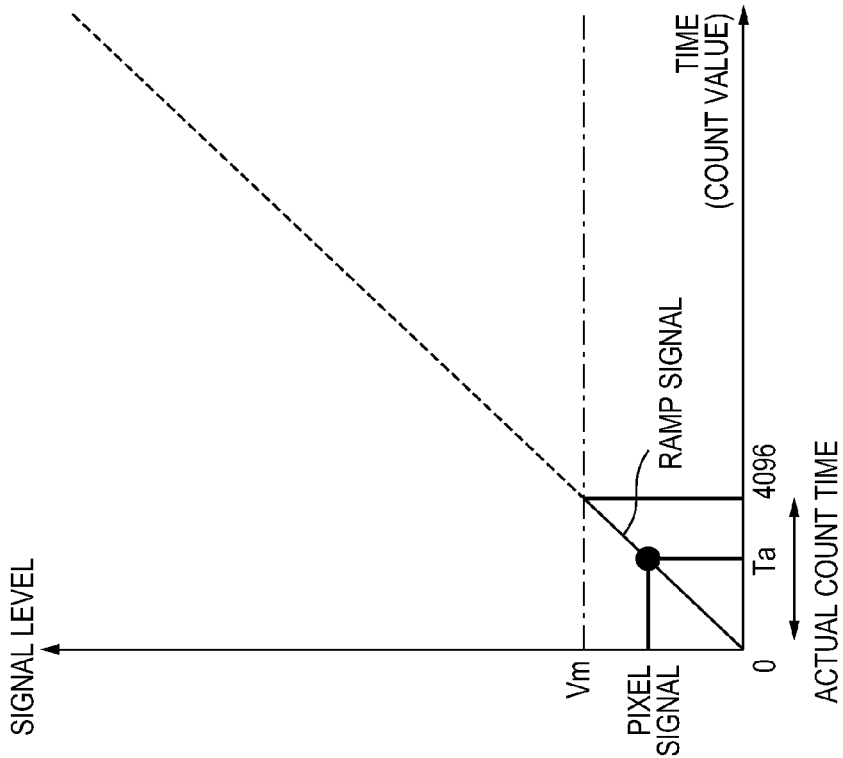
FIG. 6A  WHEN VOLTAGE OF PIXEL SIGNAL < Vm

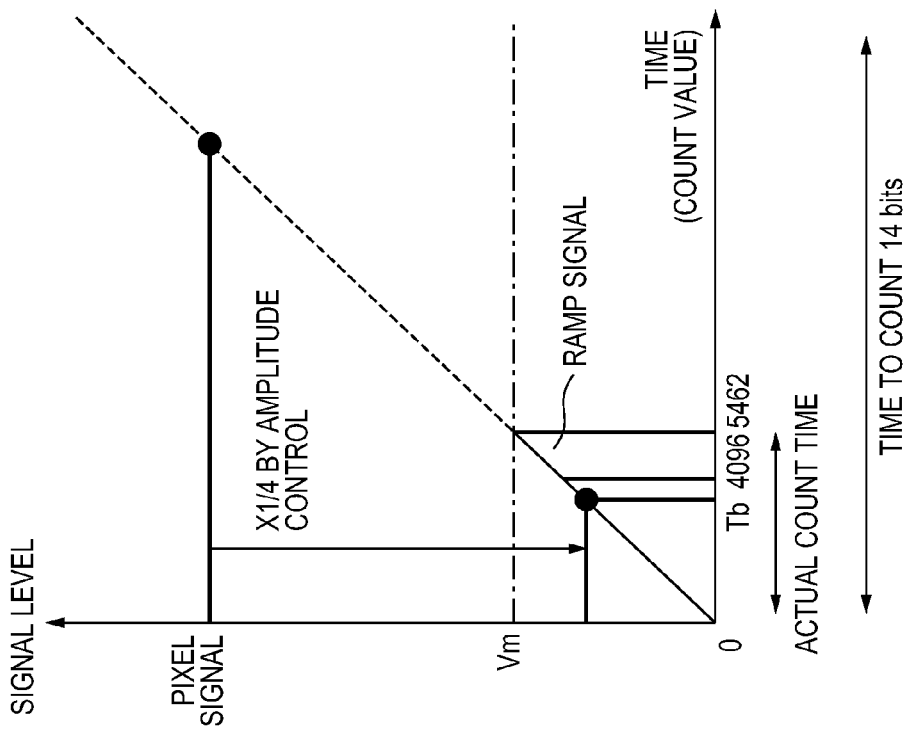
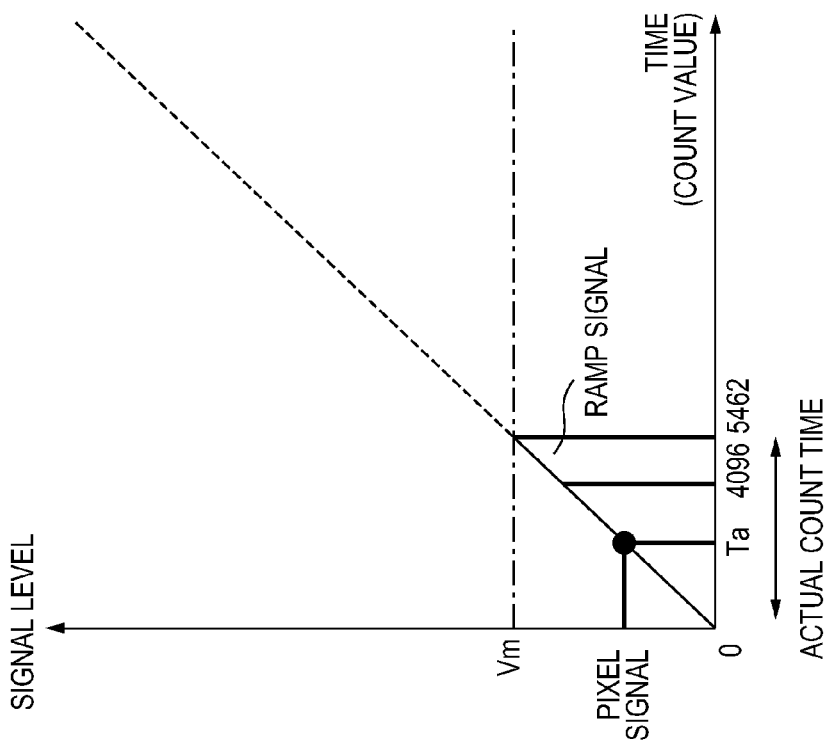

IMAGE SENSOR AND IMAGE CAPTURING APPARATUS

BACKGROUND OF THE INVENTION

1. Field of the Invention

The present invention relates to an image sensor and an image capturing apparatus.

2. Description of the Related Art

In recent image capturing apparatuses including a digital camera and digital video camera, a technique of reading out an image signal from an image sensor at high speed is required to increase the number of pixels and improve the continuous shooting speed. Therefore, when a signal read out at high speed is analog-digital (A/D)-converted for each pixel, the conversion time for each pixel data must be short. A high-performance A/D conversion circuit capable of performing highly accurate conversion in a short time is necessary.

To solve this problem, research and development are in progress for a column A/D conversion image sensor in which A/D conversion circuits which are implemented by the CMOS integrated circuit technique and can be manufactured by the same process as in a CMOS image sensor are arranged for each column of pixels of the image sensor to simultaneously A/D-convert pixel signals on one row. In the column A/D conversion image sensor, the conversion rate of the A/D conversion circuit can be lowered from a readout rate for each pixel to that for each row, thus easily speeding up the readout rate of one frame of the image sensor.

As such a column A/D conversion image sensor, Japanese Patent Laid-Open No. 05-048460 discloses a ramp A/D conversion circuit which sequentially compares a ramp signal and a pixel signal using a comparator to convert the pixel signal into a digital value corresponding to the time until inversion of the output from the comparator. Unfortunately, this ramp A/D conversion circuit requires a longer time for the output from the comparator to invert as the value of the pixel signal gets larger. For example, the (N+2)-bit A/D conversion time is about four times that in N-bit conversion.

To shorten the A/D conversion time, the following method is available. In n-bit A/D conversion, first, the amplitude of an analog signal is compared with a threshold obtained by dividing the amplitude of a full-scale analog signal by $2^k$ (k is an integer smaller than n). A/D conversion is done by a comparison with a ramp voltage. Two ramp signals with different gradients are generated to A/D-convert a pixel signal into an (n−k)-bit digital value using a ramp signal with a large gradient if the pixel signal has an amplitude higher than the threshold, or using a ramp signal with a small gradient if the pixel signal has an amplitude equal to or lower than the threshold. The A/D conversion result has (n−k) bits on the MSB side of n-bit digital data if the pixel signal has an amplitude higher than the threshold, or it has (n−k) bits on the LSB side of n-bit digital data if the pixel signal has an amplitude equal to or lower than the threshold (for example, Japanese Patent Laid-Open No. 2010-45789).

Normally, ramp signals input to an A/D conversion circuit are commonly supplied to a comparator arranged for each pixel column. However, when a ramp signal generation circuit with a gradient which varies depending on the magnitude of a pixel signal is selected, the number of comparators connected to each ramp signal generation circuit may vary for each object. If the number of connected comparators varies, the load connected to a ramp signal line changes, so the linearity of a ramp signal which changes at high speed in a predetermined amount may degrade. As a result, the A/D conversion characteristics may vary for each column. Although this problem can be solved when a ramp signal generation circuit is arranged for each column, this arrangement is undesirable as the circuit scale increases. Also, since a switch for selecting a ramp signal to be used is required for each column, the quality of a ramp signal may degrade due to noise generated by the switch, thus adversely affecting the A/D conversion characteristics such as noise and linearity.

SUMMARY OF THE INVENTION

In view of this, the present invention provides a high-speed multibit A/D conversion technique while maintaining good A/D conversion characteristics in an image sensor including, for each column, an A/D conversion circuit which performs A/D conversion using a ramp signal.

The present invention provides an image sensor comprising a pixel region in which a plurality of pixels are arranged in a row direction and a column direction, a unit which reads out pixel signals from the pixels, and an A/D conversion circuit, arranged for each column, which compares an input signal with a ramp signal that changes with temporal unidirectionality, and converts the input signal into digital data, the sensor comprising an amplitude control unit configured to compare the pixel signal with a predefined reference voltage, and input, to the A/D conversion circuit, the pixel signal if the pixel signal has a voltage less than the reference voltage, or a signal obtained by reducing an amplitude of the pixel signal if the pixel signal has a voltage of not less than the reference voltage, and a data expansion unit configured to add a predetermined number of bits to a most significant bit side of A/D-converted data if the pixel signal has the voltage less than the reference voltage, or add a predetermined number of bits to a least significant bit side of the A/D-converted data if the pixel signal has the voltage of not less than the reference voltage.

Further features of the present invention will become apparent from the following description of exemplary embodiments with reference to the attached drawings.

BRIEF DESCRIPTION OF THE DRAWINGS

FIG. 5 is a timing chart showing the timing of a readout operation according to the first embodiment of the present invention;

FIGS. 6A and 6B are graphs schematically showing the time for A/D conversion according to the first and second embodiments of the present invention;

FIGS. 10A and 10B are graphs schematically showing the time for A/D conversion according to the third embodiment of the present invention.

DESCRIPTION OF THE EMBODIMENTS

[First Embodiment]

Figure 2:
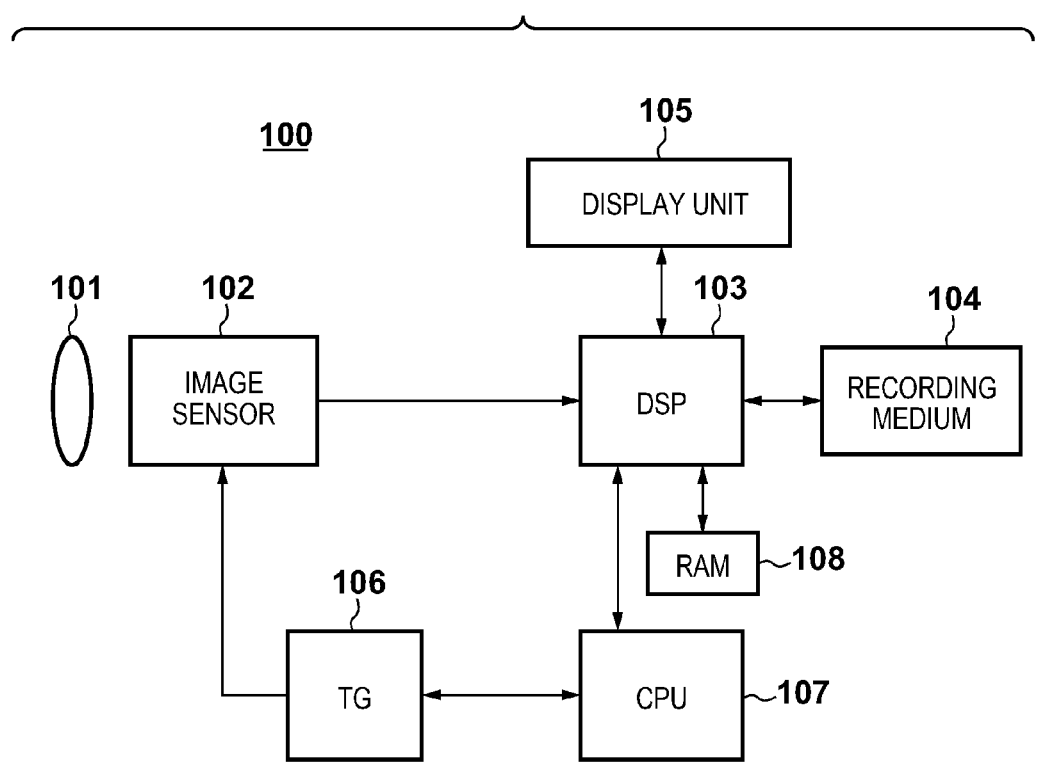
FIG. 2 is a block diagram showing the configuration of an image capturing apparatus according to the first to third embodiments.

The first embodiment will be described below with reference to the accompanying drawings. FIG. 2 is a block diagram showing the configuration of an image capturing apparatus 100 including an image sensor according to the first embodiment. Light from an object forms an image on an image sensor 102 by an imaging optical system formed by, for example, an imaging lens 101. The formed object image is photoelectrically converted by the image sensor 102 such as a CMOS image sensor. The image sensor 102 is equipped with an analog-digital conversion circuit (A/D conversion circuit) which converts an analog signal (pixel signal) into digital data. A digital signal processor (DSP) 103 performs, for example, various types of image processing and compression/decompression processing for a digital image signal output from the image sensor 102.

A recording medium 104 records image data output from the DSP 103. A display unit 105 displays, for example, captured images and various menu screens. The display unit 105 uses, for example, a liquid crystal display (LCD). A timing generator (TG) 106 supplies various drive signals to the image sensor 102 and a CPU 107. The CPU 107 controls, for example, the DSP 103 and TG 106. A RAM 108 is connected to the DSP 103, and temporarily stores, for example, image data.

Figure 3:
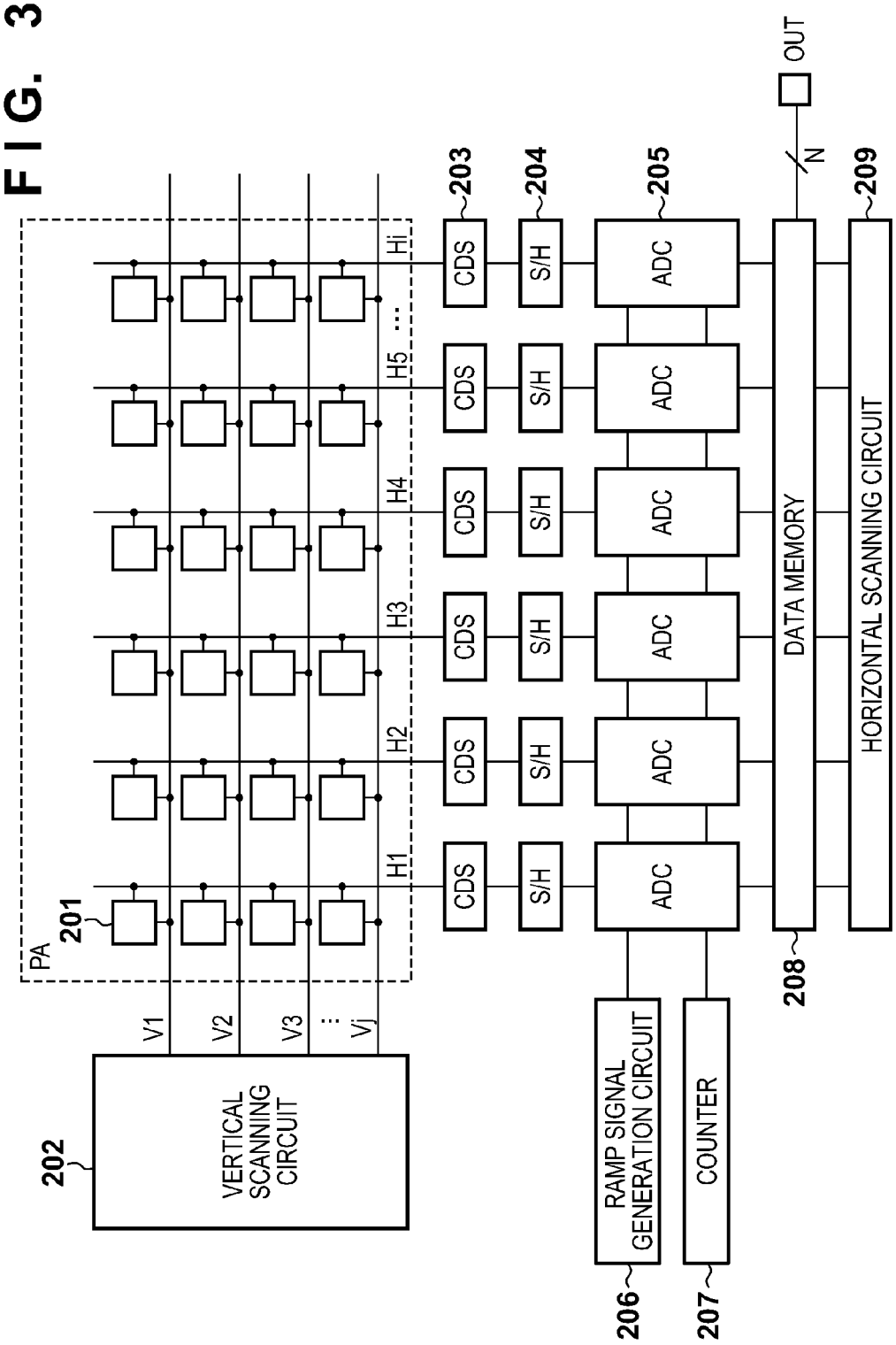
FIG. 3 is a block diagram showing the configuration of an image sensor according to the first to third embodiments of the present invention.

FIG. 3 is a block diagram showing the configuration of the image sensor 102. A plurality of pixels 201 are arranged in a pixel region PA so that i pixels 201 are aligned in the row direction and j pixels 201 are aligned in the column direction. Each pixel 201 photoelectrically converts an incident object optical image, and outputs a pixel signal. The pixel signals photoelectrically converted by the pixels 201 are transferred to vertical output lines H1 to Hi for each row in accordance with drive signals supplied from a vertical scanning circuit 202 via drive lines V1 to Vj.

The pixel signal read out from each pixel 201 is input to a correlation double sampling circuit (CDS circuit) 203 of the corresponding column, and its pixel noise is removed. The output from the CDS circuit 203 is sampled and held for each column by a sample-and-hold circuit 204. Each pixel signal held by the sample-and-hold circuit 204 is transferred to an A/D conversion circuit (ADC) 205, and converted from an analog value into a digital value and output as A/D conversion data.

The A/D conversion circuit 205 of each column serves as a ramp A/D conversion circuit. A ramp signal that changes with temporal unidirectionality is used for a comparison with a pixel signal. Ramp signals are commonly supplied from a ramp signal generation circuit 206 to the A/D conversion circuit 205. Also, the output of a counter 207 is commonly connected to the A/D conversion circuit 205 of each column to supply a count value to the A/D conversion circuit 205. The A/D conversion circuit 205 outputs the count value as an A/D conversion result, which is stored in a data memory 208 as A/D conversion data. Data of each column is selected/transferred and output from the data memory 208 of the image sensor 102 by a horizontal scanning circuit 209.

Figure 1:
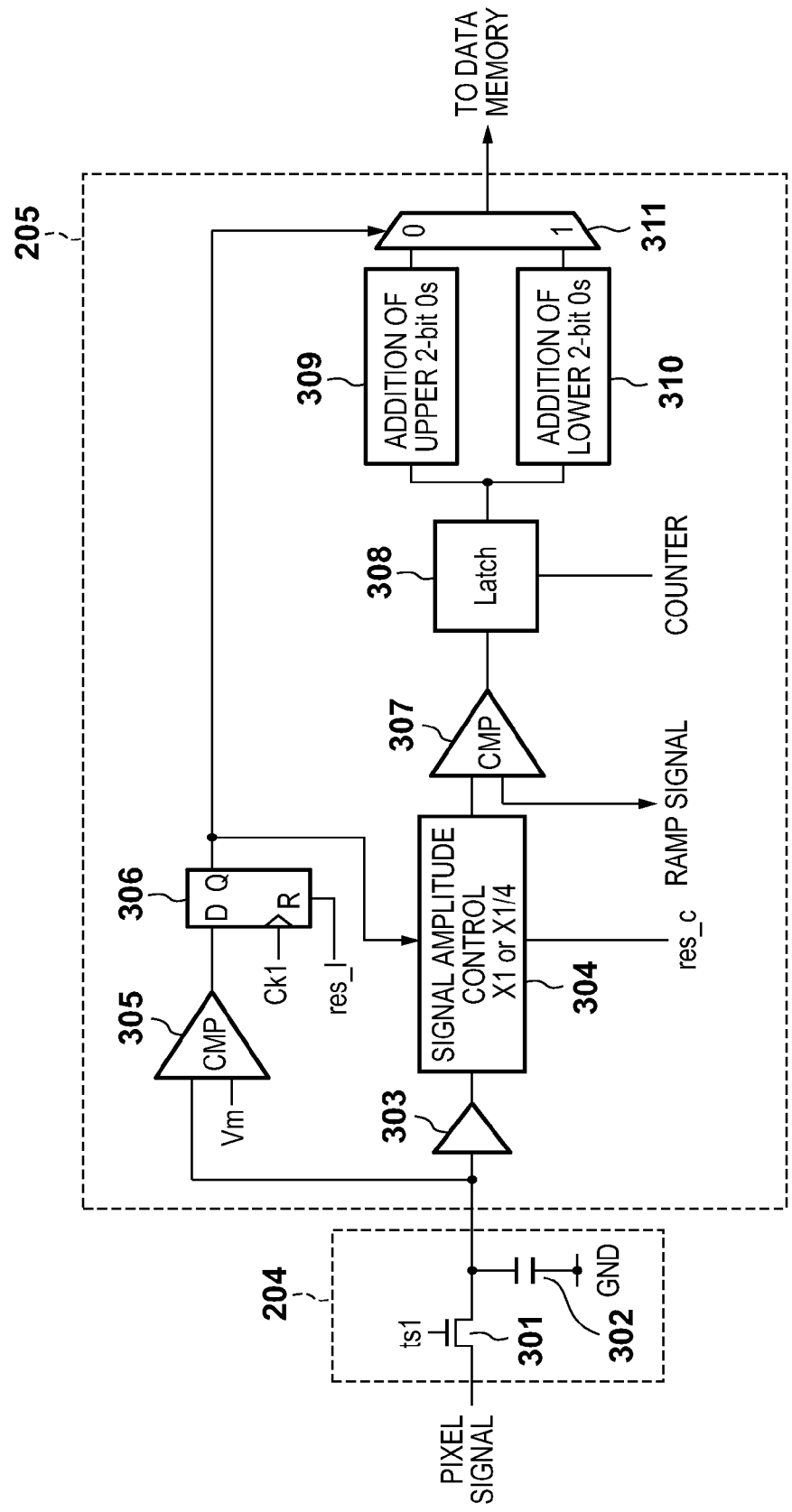
FIG. 1 is a circuit diagram showing the configuration of a sample-and-hold circuit and A/D conversion circuit according to the first embodiment of the present invention.

FIG. 1 shows the configuration of the sample-and-hold circuit 204 and A/D conversion circuit 205 of each column. Referring to FIG. 1, the sample-and-hold circuit 204 is formed by a first signal transfer switch 301 and first storage capacity 302. A pixel signal input to the sample-and-hold circuit 204 is held by the first storage capacity 302 via the first signal transfer switch 301 controlled in accordance with a drive signal ts1 of the TG 106.

The first storage capacity 302 is connected to a signal amplitude control unit 304 via a buffer 303, and is also connected to a first comparator (CMP) 305. The first comparator (CMP) 305 compares the signal in the first storage capacity 302 with a reference voltage Vm. The comparison result is input to the signal amplitude control unit 304 via a flip-flop (FF) 306. The FF 306 has its data input terminal connected to the output of the first comparator 305, loads and holds data at the leading edge of a signal ck1, and resets it in accordance with a signal res_1. The reference voltage Vm corresponds to ¼ of the full-scale amplitude of a pixel signal which can be output from a photoelectric conversion circuit in this embodiment.

The signal amplitude control unit 304 controls the amplitude of the pixel signal based on the comparison result input from the FF 306. More specifically, the amplitude of the pixel signal is directly output (same size) if the pixel signal has a voltage lower than the reference voltage Vm, or it is multiplied by ¼ and output if the pixel signal has a voltage equal to or higher than the reference voltage Vm. The output of the signal amplitude control unit 304 is connected to the input terminal of a second comparator 307.

Figure 4:
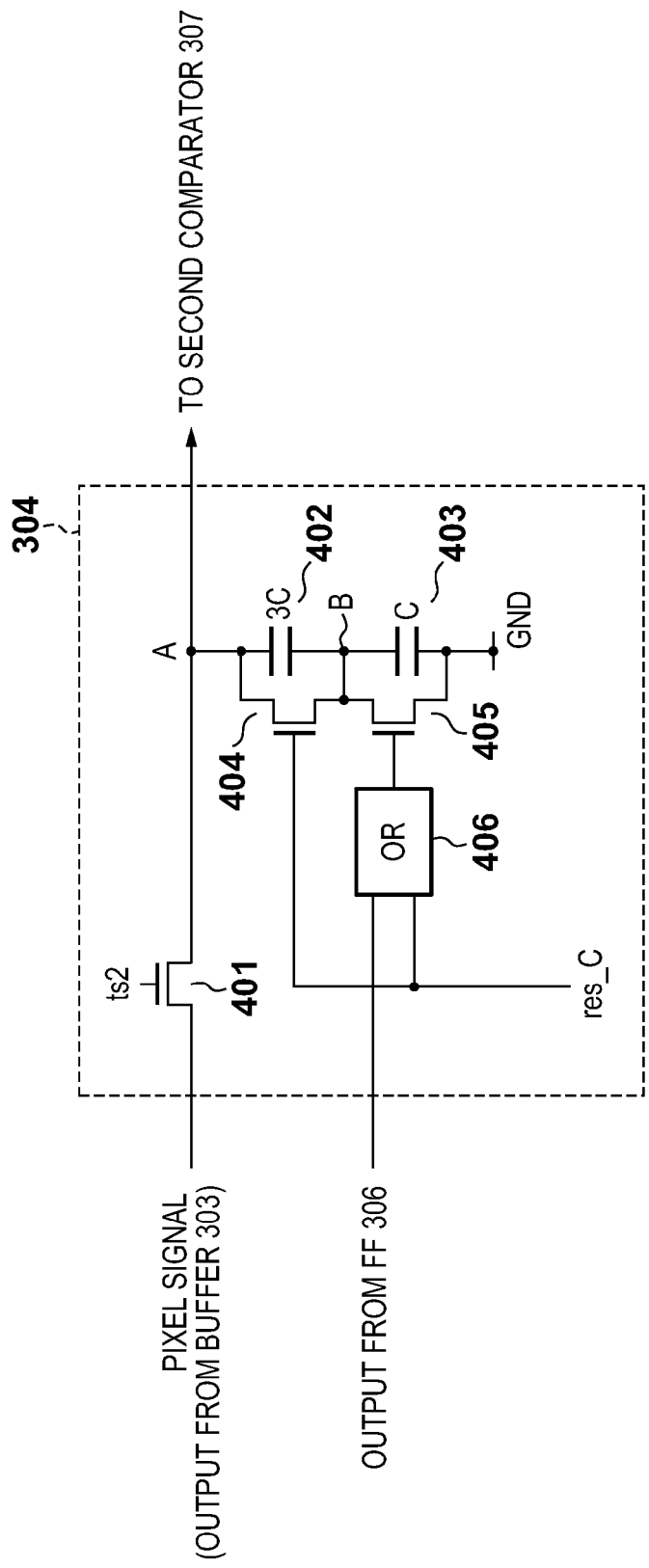
FIG. 4 is a circuit diagram illustrating an example of the configuration of a signal amplitude control unit according to the first to third embodiments of the present invention.

FIG. 4 is a circuit diagram for explaining the detailed configuration of the signal amplitude control unit 304. The operation of the signal amplitude control unit 304 will be described herein with reference to FIGS. 1 and 4. First, a pixel signal input via the buffer 303 is stored in a second storage capacity 402 and a third storage capacity 403 by closing a second signal transfer switch 401 in accordance with a drive signal ts2 from the TG 106. The second storage capacity 402 and third storage capacity 403 are connected in series with each other. A first short-circuiting switch 404 and second short-circuiting switch 405 which short the two terminals of each of the second storage capacity 402 and third storage capacity 403 are respectively connected to them.

If the pixel signal has a voltage equal to or higher than the reference voltage Vm, the output from the first comparator 305 changes to high level, and the output from the FF 306 also changes to high level in accordance with the timing of the signal ck1, so the second short-circuiting switch 405 is shorted via an OR gate 406. At this time, since a point B on a line which connects the second storage capacity 402 and third storage capacity 403 to each other is directly connected to the GND, the potential at a point A on a line which connects the second signal transfer switch 401 and second storage capacity 402 to each other changes. Note that since the capacitance value of the second storage capacity 402 is set three times that of the third storage capacity 403, the potential at the point A when the second short-circuiting switch 405 is shorted is ¼ of the original potential. This means that the signal amplitude control unit 304 can set the amplitude of an input signal to ¼.

Referring back to FIG. 1, the second comparator 307 compares the levels of a pixel signal and ramp signal after amplitude control. The output from the second comparator 307 is input to a latch circuit (Latch) 308, and the output from the second comparator 307 is inverted when the level of the ramp signal exceeds that of the pixel signal. The counter starts to operate in accordance with the timing at which a ramp signal is generated, and its output value is input to the latch circuit 308. When the output from the second comparator 307 is inverted, the count value of the counter at that time is held by the latch circuit 308. The time until inversion of the output from the second comparator 307 is measured to execute A/D conversion. The measured time corresponds to the count value of the counter. If the pixel signal has a voltage lower than the reference voltage Vm, it is directly output to the second comparator 307 while maintaining unity magnification (same size) without controlling the first and second short-circuiting switches. A/D conversion is done in the same way as in the case wherein the pixel signal has a voltage equal to or higher than the reference voltage Vm.

At this time, when the full scale of the A/D conversion output is N bits, the counter counts (N−2) bits, that is, $2^{(N-2)}-1$. If the pixel signal has a voltage lower than the reference voltage Vm, a data expansion unit 309 adds 2-bit 0s to the MSB side of the data held by the latch circuit 308. If the pixel signal has a voltage equal to or higher than the reference voltage Vm, a data expansion unit 310 adds 2-bit 0s to the LSB side of the data held by the latch circuit 308 because the value of this data is ¼ of an actual value. The output data selection unit 311 selects data of one of the data expansion units 309 and 310 in accordance with the output from the FF 306, and outputs it to the data memory 208.

The outline of the operation timing of the image sensor 102 will be described next. FIG. 5 is a timing chart showing the operation of the image sensor 102. In the readout operation period of the kth row, the drive signal ts1 changes to high level, and the signal in each pixel of the kth row is stored in the first storage capacity 302 via the first signal transfer switch 301. After the drive signal ts1 changes to low level, the drive signal ts2 is changed to high level. The second signal transfer switch 401 is turned on, and the signal in the first storage capacity 302 is transferred to the second storage capacity 402 and third storage capacity 403 via the buffer 303. At this time, the pixel signal is input to the first comparator 305.

On the other hand, after the drive signal ts2 is changed to low level to turn off the second signal transfer switch 401, the signal ck1 is input to the FF 306 to load the output value of the first comparator 305 into the FF 306 as the comparison result between the pixel signal and the reference voltage Vm. The amplitude of the pixel signal is changed by the signal amplitude control unit 304 in accordance with a signal from an output terminal Q of the FF 306.

A ramp signal is generated by the ramp signal generation circuit 206 to perform an A/D conversion operation on the kth row. At this time, an A/D conversion operation on the kth row, and a pixel signal readout operation on the (k+1)th row are performed in parallel to transfer a pixel signal on the (k+1)th row to the first storage capacity 302. After the end of the A/D conversion operation on the kth row, digital data after A/D conversion is transferred to the data memory 208. Upon the operation of the horizontal scanning circuit 209, the data of the kth row stored in the data memory 208 is sequentially read out and output from the image sensor 102. After the data of the kth row is transferred to the data memory, signals res_l and res_c are changed to high level in preparation for an A/D conversion operation on the (k+1)th row to reset, for example, the FF 306, second storage capacity 402, and third storage capacity 403.

FIGS. 6A and 6B are graphs each schematically showing the relationship between the signal level of the pixel signal on the ordinate, and the count value corresponding to the time for A/D conversion on the abscissa. An alternate long and short dashed line indicates the level of the reference voltage Vm. As shown in FIG. 6A, if the pixel signal has a voltage lower than the reference voltage Vm, a count value Ta of the counter 207 the moment the value of the ramp signal exceeds that of the pixel signal is stored in the latch circuit 308. At this time, a value obtained by adding 0s to the upper 2 bits of the count value Ta becomes the final output value from the A/D conversion circuit 205.

As shown in FIG. 6B, if the pixel signal has a voltage equal to or higher than the reference voltage Vm, the second short-circuiting switch 405 of the signal amplitude control unit 304 is shorted by the output from the first comparator 305. As a result, the amplitude of the pixel signal is changed to ¼, this pixel signal is A/D-converted, and a count value Tb of the counter 207 is stored in the latch circuit 308. A value obtained by adding 0s to the lower 2 bits of the count value Tb becomes the final output value from the A/D conversion circuit 205.

As shown in FIGS. 6A and 6B, in this example, the data output upon A/D conversion has a width of 14 bits, but the actual count is 4,096 corresponding to 12 bits. The required conversion time is as short as ¼ when 14 bits are counted. Also, since the type of ramp signal used in accordance with the amplitude level of the pixel signal is not switched for each column, the load connected to the ramp signal line is constant, thus easily ensuring a given quality of the ramp signal. This allows high-speed multibit A/D conversion while maintaining good A/D conversion characteristics.

Note that the count operation may be ended the moment A/D conversion is completed by all A/D conversion circuits 205 after a logical AND signal of the output from the second comparator 307 of the A/D conversion circuit 205 for each column is supplied to the counter 207. This makes it possible to further shorten the time for A/D conversion, compared to the case wherein 12 bits are counted.

[Second Embodiment]

In the first embodiment, the pixel signal and the reference voltage Vm are compared with each other using the first comparator 305. Hence, in addition to the second comparator 307 for a comparison with the ramp signal, two comparators are necessary for each column. A configuration in which a comparator for a comparison with the reference voltage Vm is also used as a comparator for a comparison with the ramp signal to keep the circuit scale small will be described herein.

Figure 7:
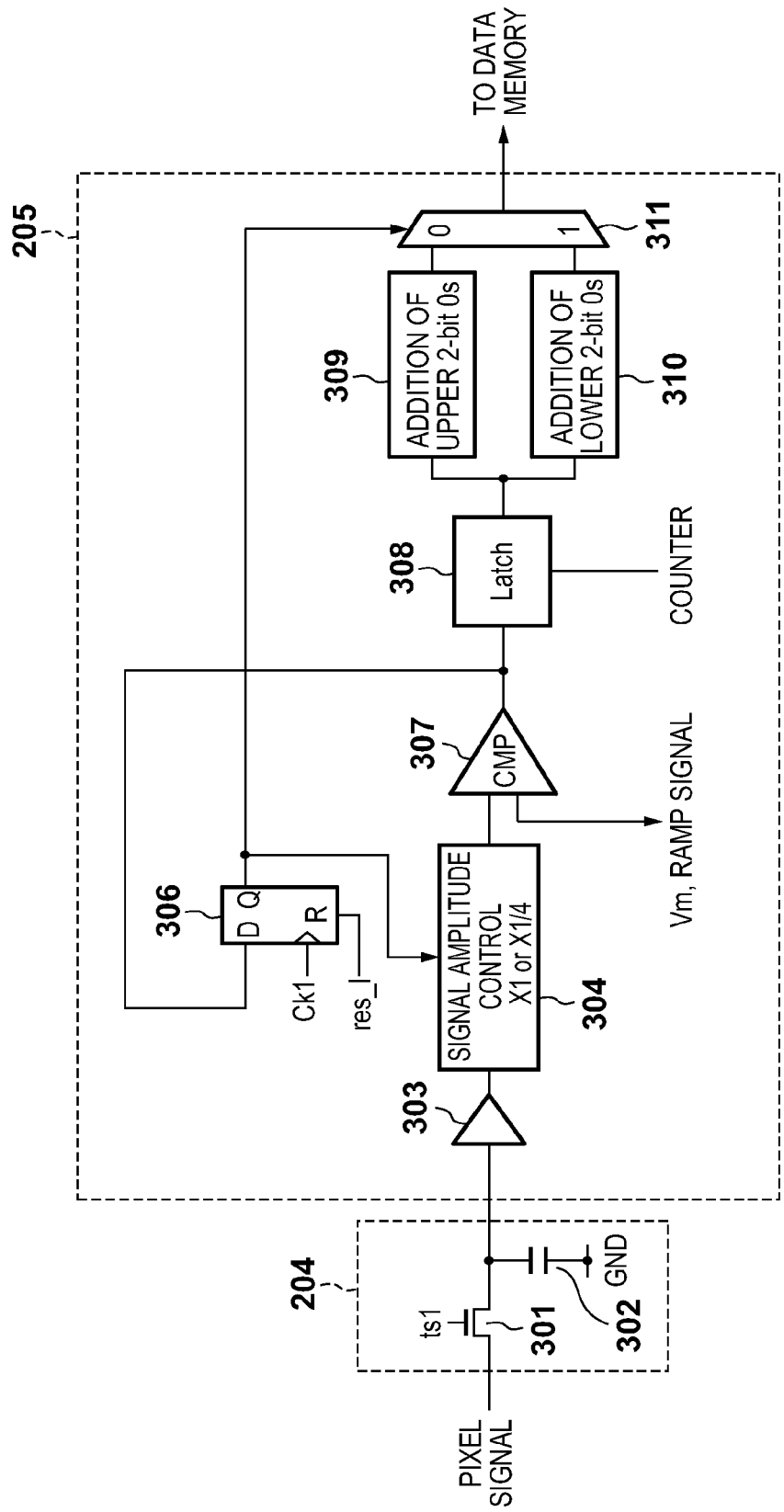
FIG. 7 is a circuit diagram showing the configuration of a sample-and-hold circuit and A/D conversion circuit according to the second embodiment of the present invention.

FIG. 7 shows the configuration of a sample-and-hold circuit 204 and A/D conversion circuit 205 of each column. The sample-and-hold circuit 204 has the same configuration as in FIG. 1. A signal in a first storage capacity 302 is input to a signal amplitude control unit 304 via a buffer 303. The output of the signal amplitude control unit 304 is connected to a second comparator 307, and compared with a reference voltage Vm or a ramp signal.

The output from the second comparator 307 is input to a latch circuit (Latch) 308, and connected to the input of a flip-flop (FF) 306. The FF 306 has its clock terminal which receives a signal ck1, and its reset terminal which receives a signal res_l. The output of the FF 306 is connected to the signal amplitude control unit 304 and an output data selection unit 311 in the same way as in FIG. 1. Other features in FIG. 7 are the same as in FIG. 1, and a description thereof will not be given.

Figure 8:
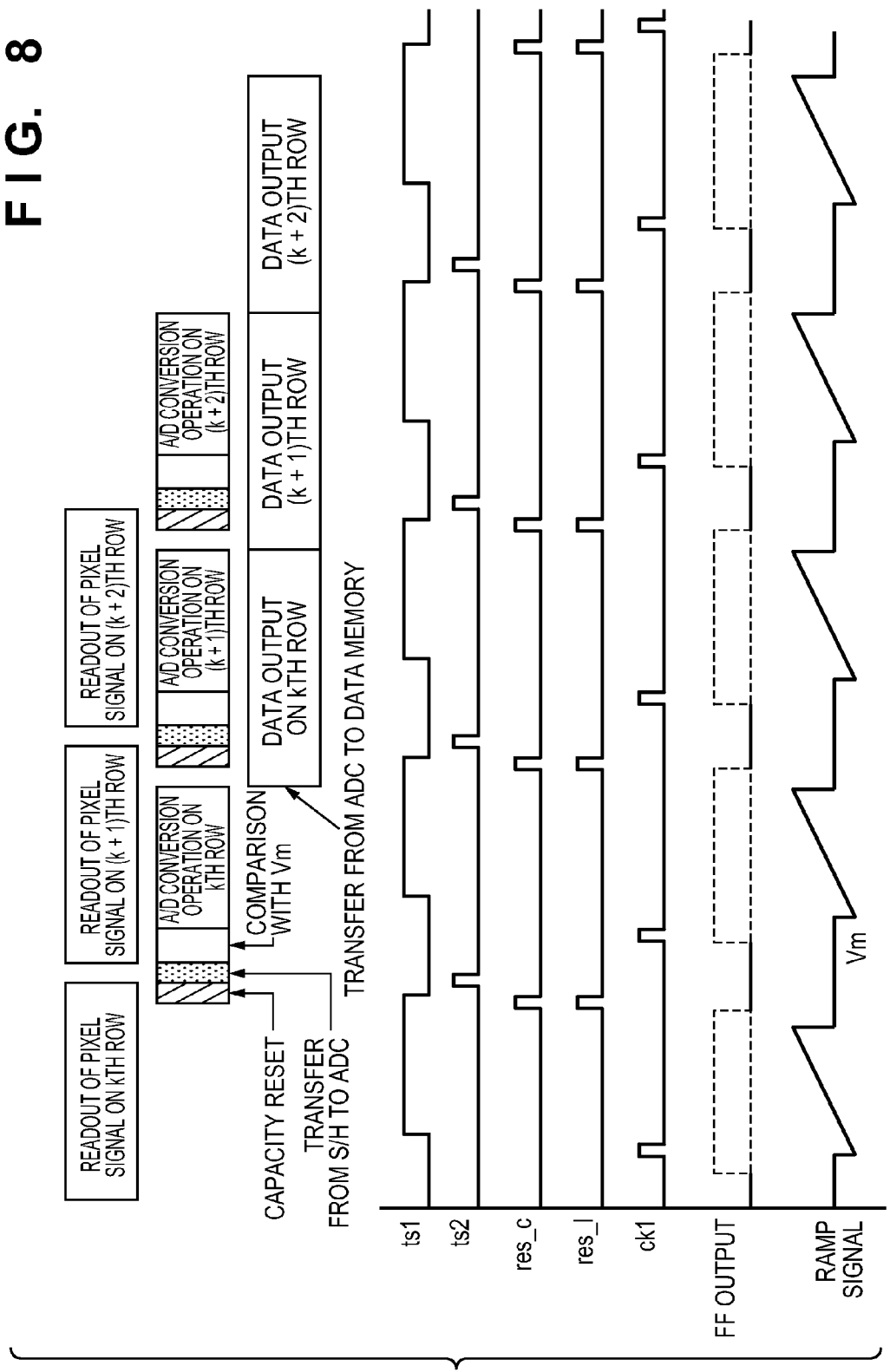
FIG. 8 is a timing chart showing the timing of a readout operation according to the second embodiment of the present invention.

The operation timing will be described herein with reference to FIG. 8. FIG. 8 is a timing chart showing the operation of an image sensor 102. First, before an A/D conversion operation on the kth row, the output from a ramp signal generation circuit 206 is set as a constant reference voltage Vm. At this time, the signal amplitude control unit 304 directly outputs an input pixel signal (same size). The levels of the pixel signal and reference voltage Vm are compared with each other using the second comparator 307. The result of a comparison with the reference voltage Vm by the second comparator 307 is held in the FF 306 the moment a pulse is input in accordance with the signal ck1.

If the pixel signal has a voltage equal to or higher than the reference voltage Vm, the output from the FF 306 changes to high level, so the signal amplitude control unit 304 multiplies the signal amplitude by $1/4$. If the pixel signal has a voltage lower than the reference voltage Vm, the output from the FF 306 has low level, so the signal amplitude control unit 304 directly outputs a signal amplitude (same size). An A/D conversion operation starts, the ramp signal generation circuit 206 generates a ramp signal, and a counter 207 starts its count operation for A/D conversion. The operation after the end of A/D conversion is the same as in the first embodiment.

With the above-mentioned arrangement, a comparison with the reference voltage Vm, and a comparison with the ramp signal are time-divisionally performed using the second comparator 307. This obviates the need for the first comparator 305 in the first embodiment to keep the circuit scale small.

[Third Embodiment]

In the above-mentioned first and second embodiments, the reference voltage Vm corresponds to (N−M) bits of the full-scale amplitude (N bits), and N=14 and M=2 as an example. However, 1/(Power of 2) of the full-scale amplitude does not always become an optimum reference voltage Vm, depending on the applied system, due to factors associated with the balance between the influence that a quantization error has on the image quality, and the A/D conversion speed required in terms of the specification.

Figure 9:
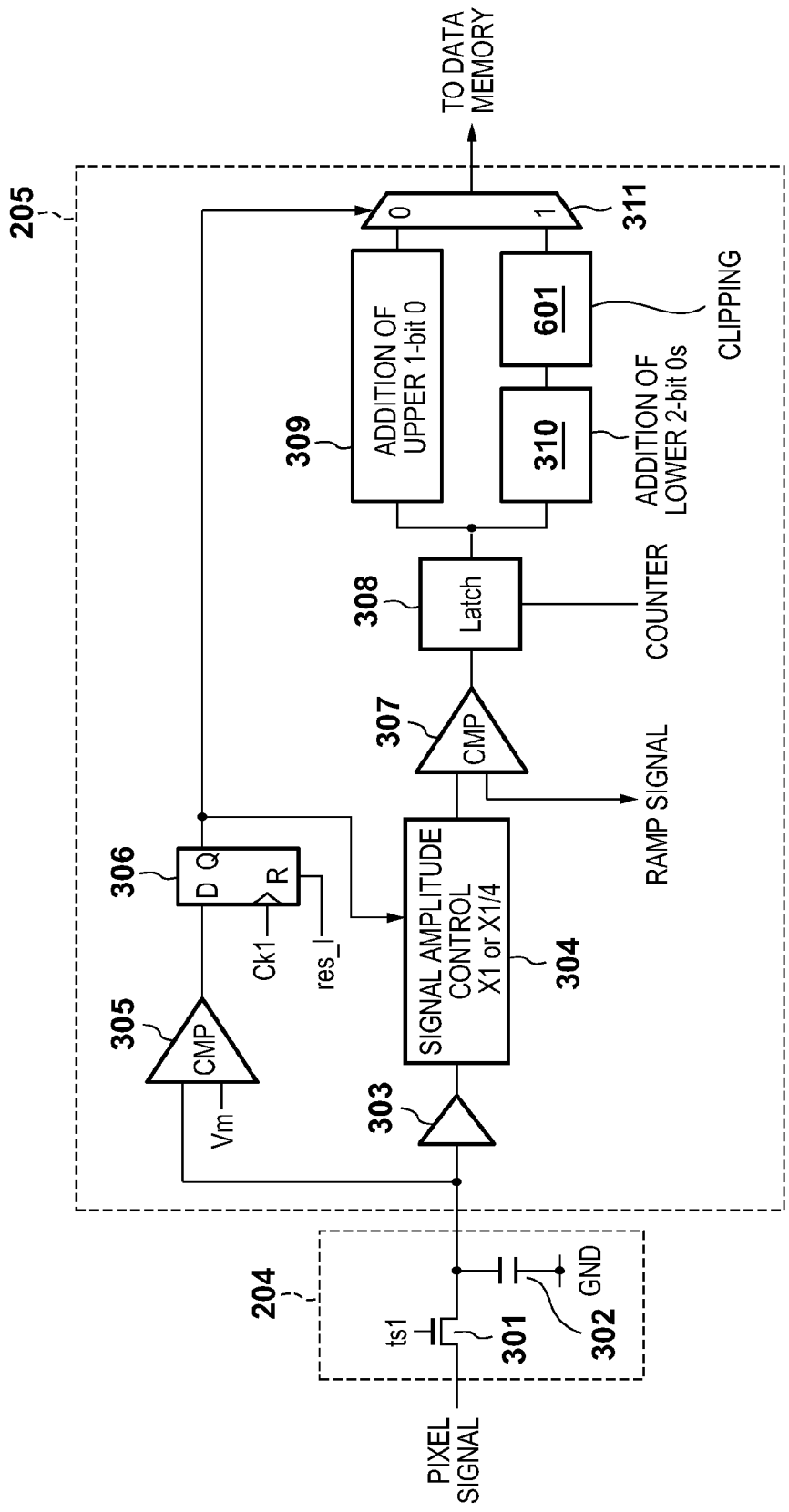
FIG. 9 is a circuit diagram showing the configuration of a sample-and-hold circuit and A/D conversion circuit according to the third embodiment of the present invention.

A configuration in which a reference voltage Vm is not 1/(Power of 2) of the full-scale amplitude will be described herein with reference to FIGS. 9, 10A, and 10B. FIG. 9 is a circuit diagram showing the configuration of a sample-and-hold circuit 204 and A/D conversion circuit 205 according to this embodiment. FIG. 9 is different from FIG. 1 in that in the former 1 bit is added to the MSB side in a data expansion unit 309, and a clipping unit 601 is disposed after 2 bits are added to the LSB side in a data expansion unit 310. The reason for this arrangement will be explained later. The reference voltage Vm has a level of (Full-scale Amplitude)×$1/3$. Also, as shown in FIGS. 10A and 10B, the range in which the ramp signal changes is $1/3$ or less of the full-scale amplitude, and the counter counts 5,462 which covers $1/3$ of 14 bits (16,383). Therefore, the counter has a 13-bit full scale but counts only halfway.

If the pixel signal is determined to have a voltage lower than the reference voltage Vm, the output from an FF 306 has low level, so a count operation is performed while the signal amplitude remains the same. Fourteen-bit data obtained by adding 1-bit 0 to the MSB side of a count value Ta of the count result is output to the data memory. This is because counting is done halfway to 13 bits.

If the pixel signal is determined to have a voltage equal to or higher than the reference voltage Vm, a count operation is performed after the signal amplitude is multiplied by $1/4$, and 2-bit 0s are added to the LSB side of a count value Tb of the count result. The clipping unit 601 clips data exceeding an upper limit of a predetermined number of bits or more to limit the data width, and outputs the result to the data memory. Since a counter 207 counts only halfway (5,462) to 13 bits, the result obtained when lower 2 bits are added may exceed 16,383 corresponding to 14 bits as the upper limit value of the count operation. Hence, the clipping unit 601 limits the output data to 16,383 when it exceeds 16,383.

The case wherein the reference voltage Vm is set to a level other than 1/(Power of 2) of the full-scale amplitude has been described above. In this case as well, the A/D conversion time can be set $1/3$ that when 14 bits are counted, thus attaining high-speed A/D conversion despite the use of multibit data. The reference voltage Vm can be set to a level which is not problematic in terms of the image quality due to factors associated with the balance between a quantization error and light-shot noise. A common comparator may be used in this embodiment as well, as a matter of course.

Although embodiments of the present invention have been described above, the present invention is not limited to these embodiments, and various modifications and changes can be made without departing from the scope of the present invention. Although a configuration in which, for example, the data expansion unit adds a predetermined number of 0s to the MSB or LSB side to perform data expansion is used in the above-mentioned embodiment, the present invention is not limited to this. If the amplitude of a pixel signal is high (a high-luminance signal is obtained) in the image sensor, the influence of light-shot noise increases, so the influence that a quantization error has on the image quality reduces. Therefore, not only 0 but also 1 may be added to the lower bits. Also, a circuit which generates random data may be used in the data expansion unit to add the random data to the lower bits.

Also, although the output value of final digital data is 14 bits, and 12 or 13 bits are counted in an actual count operation in the above-mentioned embodiments, the present invention is not limited to this, and a suitable number of bits may be used in accordance with the system. The amplitude controlled by the signal amplitude control unit, the data bit width, and the number of bits of the counter must be appropriately set, as a matter of course.

Moreover, although the data expansion unit has a simple configuration which adds bits to the MSB or LSB side in the above-mentioned embodiments, the data expansion unit may be implemented by a multiplier. For example, as in the third embodiment, when the reference voltage Vm is $1/3$ of the full-scale amplitude, the amplitude control unit may set the amplitude to $1/3$ if the pixel signal has a voltage equal to or higher than the reference voltage Vm, and the data expansion unit may multiply it by a gain of 3.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-155881, filed Jul. 11, 2012, which is hereby incorporated by reference herein in its entirety.

What is claimed is:

1. An image sensor comprising:
a pixel region in which a plurality of pixels are arranged in a row direction and a column direction;
a reading out unit which reads out pixel signals from the pixels;
an A/D conversion unit, arranged for each column, which includes an amplitude control unit configured to control amplitudes of the pixel signals in accordance with a signal level of the pixel signals, and a comparing unit configured to compare the pixel signals of which the amplitudes were controlled by said amplitude control unit with a ramp signal that changes with temporal unidirectionality,
wherein said amplitude control unit reduces the amplitude of the pixel signal in a case where the signal level of the pixel signal is not less than a predefined reference voltage.

2. The sensor according to claim 1, wherein said comparing unit time-divisionally compares the signal level of the pixel signal and the ramp signal.

3. The sensor according to claim 1, wherein said amplitude control unit comprises a plurality of capacities which are connected in series with each other and configured to store pixel signals, and a switch unit configured to short two terminals of at least one capacity, and said switch unit shorts two terminals of the capacity to change an amplitude of the pixel signal.

4. The sensor according to claim 1, wherein said A/D conversion unit further includes a data expansion unit configured to add a predetermined number of bits to a most significant bit side or a least significant bit side of output data of the comparing unit.

5. The sensor according to claim 4, wherein addition of the predetermined number of bits to the least significant bit side of the output data of the comparing unit in said data expansion unit is performed by multiplying the output data.

6. The sensor according to claim 4, wherein said data expansion unit includes a unit configured to, in a case where the predetermined number of bits are added to the least significant bit side of the output data of the comparing unit, clip a given number of bits or more of data to which the predetermined number of bits are added.

7. The sensor according to claim 4, wherein said data expansion unit adds a predetermined number of bits formed by at least one of 0 and 1 to the least significant bit side of the output data of said comparing unit in a case where the signal level is not less than the reference voltage, and adds a predetermined number of bits formed by 0 to the most significant bit side of the output data in a case where the signal level is less than the reference voltage.

8. The sensor according to claim 4, wherein the data expansion unit adds a predetermined number of bits to a most significant bit side of the output data of said comparing unit in a case where the signal level is less than the reference voltage, and adds a predetermined number of bits to a least significant bit side of the output data in a case where the signal level is not less than the reference voltage.

9. An image capturing apparatus comprising:
an image sensor defined in claim 1;
an imaging optical system configured to form an image of light on said image sensor; and
a signal processing circuit configured to process the output from said image sensor.

10. The sensor according to claim 1, wherein said amplitude control unit amplifies the pixel signal at a gain which is less than the same magnification, in a case where said amplitude control unit reduces the amplitude of the pixel signal.

11. An image sensor comprising:
a pixel region in which a plurality of pixels are arranged in a row direction and a column direction;
a reading out unit which reads out pixel signals from the pixels;
an A/D conversion unit which includes an amplitude control unit configured to control amplitudes of the pixel signals in accordance with a signal level of the pixel signals, and a comparing unit configured to compare the pixel signals of which the amplitudes were controlled by said amplitude control unit with a ramp signal that changes with temporal unidirectionality,
wherein said amplitude control unit reduces the amplitude of the pixel signal in a case where the signal level of the pixel signal is not less than a predefined reference voltage.

12. The sensor according to claim 11, wherein said comparing unit time-divisionally compares the signal level of the pixel signal and the ramp signal.

13. The sensor according to claim 11, wherein said amplitude control unit comprises a plurality of capacities which are connected in series with each other and configured to store pixel signals, and a switch unit configured to short two terminals of at least one capacity, and said switch unit shorts two terminals of the capacity to change an amplitude of the pixel signal.

14. The sensor according to claim 11, wherein said A/D conversion unit further includes a data expansion unit configured to add a predetermined number of bits to a most significant bit side or a least significant bit side of output data of the comparing unit.

15. The sensor according to claim 14, wherein the data expansion unit adds a predetermined number of bits to a most significant bit side of the output data of said comparing unit in a case where the signal level is less than the reference voltage, and adds a predetermined number of bits to a least significant bit side of the output data in a case where the signal level is not less than the reference voltage.

16. The sensor according to claim 14, wherein said data expansion unit adds a predetermined number of bits formed by at least one of 0 and 1 to the least significant bit side of the output data of said comparing unit in a case where the signal level is not less than the reference voltage, and adds a predetermined number of bits formed by 0 to the most significant bit side of the output data in a case where the signal level is less than the reference voltage.

17. The sensor according to claim 14, wherein addition of the predetermined number of bits to the least significant bit side of the output data of the comparing unit in said data expansion unit is performed by multiplying the output data.

18. The sensor according to claim 14, wherein said data expansion unit includes a unit configured to, in a case where the predetermined number of bits are added to the least significant bit side of the output data of the comparing unit, clip a given number of bits or more of data to which the predetermined number of bits are added.

19. The sensor according to claim 11, wherein said amplitude control unit amplifies the pixel signal at a gain which is less than the same magnification, in a case where said amplitude control unit reduces the amplitude of the pixel signal.

20. An image capturing apparatus comprising:
an image sensor defined in claim 11;
an imaging optical system configured to form an image of light on said image sensor; and
a signal processing circuit configured to process the output from said image sensor.

* * * * *